United States Patent

Walker

[11] 4,233,847
[45] Nov. 18, 1980

[54] PASSIVE LASER ACCELEROMETER

[76] Inventor: Clifford G. Walker, 915 Weatherly Rd., Huntsville, Ala. 35803

[21] Appl. No.: 54,373

[22] Filed: Jul. 2, 1979

[51] Int. Cl.$^3$ .................. G01P 15/08; G01B 11/18
[52] U.S. Cl. ............................ 73/517 R; 356/33
[58] Field of Search ............ 73/517 R, 517 B, 516 R, 73/516 LM, 141 A; 356/32, 33

[56] References Cited

U.S. PATENT DOCUMENTS

| | | | |
|---|---|---|---|
| 3,800,594 | 4/1974 | Hutchings et al. | 73/516 R |
| 4,155,251 | 5/1979 | Lautzenhiser | 73/141 A |

*Primary Examiner*—James J. Gill

*Attorney, Agent, or Firm*—Nathan Edelberg; Robert P. Gibson; Harold W. Hilton

[57] ABSTRACT

An accelerometer utilizing a laser source and a resonant cavity formed by a pair of spaced mirrors. A birefringent isotropic material is disposed in the resonant cavity. Light generated by the laser is reflected back and forth between the mirrors and through the birefringent material to generate a pair of orthogonally polarized beams. The optical path of one beam is changed in response to acceleration forces acting on a proof mass carried on the birefringent material. The pair of beams produced have different phases. The phase difference will be by an amount proportional to the difference in refractive indexes along and perpendicular to the optic axis of the birefringent material.

8 Claims, 3 Drawing Figures

PASSIVE LASER ACCELEROMETER

BACKGROUND OF THE INVENTION

The present invention relates to a passive laser accelerometer which utilizes a laser external of a resonant cavity having a birefringent material therein which produces a pair of orthoganally polarized beams differing in phase.

Other laser accelerometers are known in which the laser source is positioned in the resonant cavity which results in mode locking problems. Under low input accelerations the phases of the two oscillations lock-together and the output beat frequency remains unchanged. To obtain an output the birefringent material must be stressed beyond the lock-in value.

Additionally, mounting the birefringent material in the resonant cavity provides residual strains in the birefringent material and the laser and birefringent material are in such close proximity that the birefringent is heated, creating more undesirable residual strains in the birefringent material.

In one embodiment of the invention the system is implemented in an integrated optics format. The principle of integrated optics is disclosed in the publication "Spectrum", pages 22-29, December 1978, entitled "Integrated Optical Spectrum Analyzer: an Imminent Chip".

SUMMARY OF THE INVENTION

An accelerometer including a pair of spaced mirrors forming a resonant cavity having a birefringent material therein. A proof mass is carried on the birefringent material. A laser generates light which is reflected back and forth between the mirrors. Part of the laser energy passes through one mirror and a polarizer, and onto a detector. The output of the detector is a beat frequency proportional to the input acceleration. Prior to using the detector output a voltage is generated and applied to a sensing element to fix the cavity length. The beat frequency depends only on the change in refractive index and is proportional to the acceleration induced optical path difference. With the birefringent material in the resonant cavity, the laser oscillates in two orthogonal plane polarized modes. The directions of polarization is along and perpendicular to the optic axis of the element.

DESCRIPTION OF THE PREFERRED EMBODIMENTS

Figure 1:
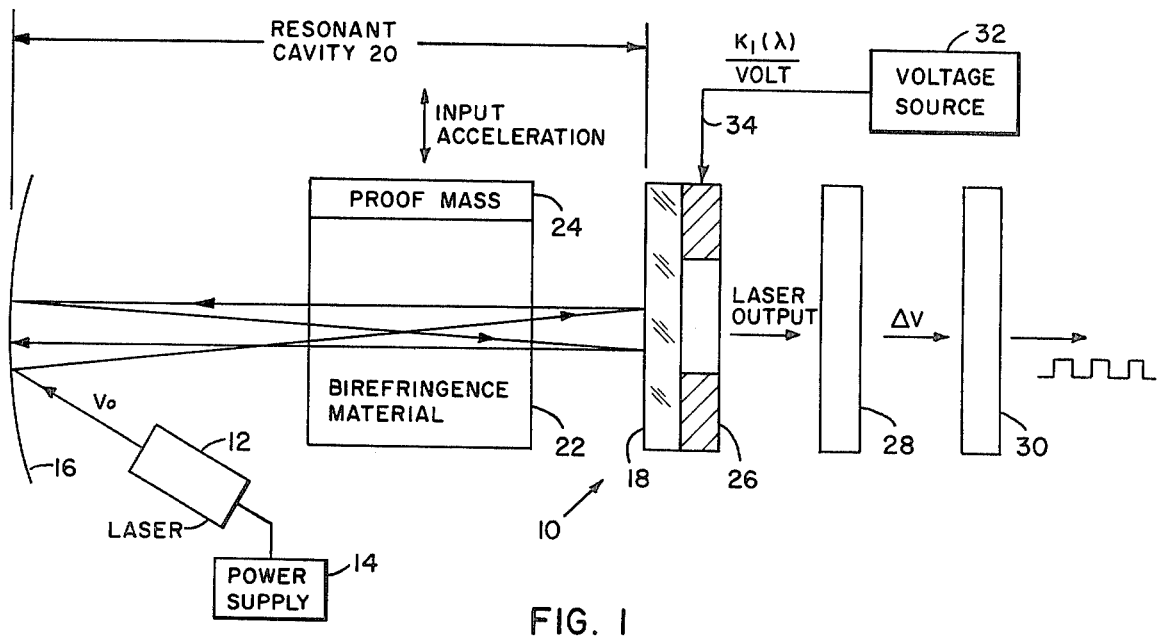
FIG. 1 is a diagrammatic view of the passive laser accelerometer of the present invention.

As shown in FIG. 1, accelerometer 10 includes a laser 12 and a power supply 14. A reflecting mirror 16 (which may be spherical or plane) is in spaced relation with a partially transmitting plane mirror 18 to form a resonant cavity 20. A birefringent material 22 having a proof mass 24 thereon is carried in the resonant cavity. Secured pepherally to plane mirror 18 is a piezoelectric crystal 26. The crystal is shown to be toroidal but may be of other shapes. A plane polarizer 28 is in spaced relation with crystal 26 and a detector 30 is spaced from polarizer 28. The detector may be an optical processor or a photo diode assembly. The output of the detector is a beat frequency proportional to the input acceleration. A voltage source 32 is provided to generate a voltage which is applied to piezoelectric 26 (through connecting circuit 34) to fix cavity length.

In operation, laser 12 is energized by power supply 14 producing a laser beam with frequency Vo. Mirror 16 reflects the beam into resonant cavity 20 and through the birefringent material (double refracting) sensor 24 onto plane mirror 18 and is reflected back through the sensor 22 to mirror 16 producing a resonant condition. Part of the laser energy is allowed to pass through mirror 18, polarizer 28 and into the detector system 30 which may be an optical processor or a photo diode scheme. The output of the detector is a beat frequency proportional to the input acceleration. Prior to using the detector output a voltage must be generated and applied to the crystal 26, through the connecting circuit 34. This voltage ($K_f(\lambda)$/volt) applied to the piezoelectric element 26 will fix the cavity length 20 and produce the proper beat frequency ($\Delta V$). The change in cavity length per volt will depend on the selected constant $K_f$. The voltage is applied by any of many conventional means (a potentiometer, for example) until the cavity length is changed for maximum output. The proof mass 24 is attached to the birefringent (double refracting) material 22 and under acceleration stresses induces optical birefringence of the photoelastic photoelastic material 22. In order to observe a beat frequency ($\Delta V$), a plane polarizer 28 is inserted at 45 degrees to the two orthogonal planes of polarization. This is necessary in order to resolve the orthogonal plane polarized waves along a direction containing a component of each. The beat frequency ($\Delta V$) depends only upon the differential change in refractive index and is not influenced by any change in cavity length that may arise from mechanical vibration or thermal expansion. The acceleration sensitive birefringent material may be a gas, liquid, or solid, however, the solid photoelastic material 22 provides greater sensitivity.

The signal beam and local oscillator beam in the cavity 20 are coincident. This enables both beams to see the same reflector surface and the same optical path everywhere, except through the sensor 24. It is possible in this type of laser for each beam to retain its identity by its state of polarization. With an input acceleration stress the optical path is different for polarization in the coincident beam and the two waves are combined, thus obtaining a beat frequency ($\Delta V$) proportional to the acceleration induced optical path difference. With the sensor 22 in the cavity 20 the laser will oscillate in two orthogonal plane polarized modes. The directions of polarization will be along and perpendicular to the optic axis of the element. Two orthogonal modes will differ in phase by an amount proportional to the difference in refractive indexes along and perpendicular to the optic axis of the element 24.

Figure 2:
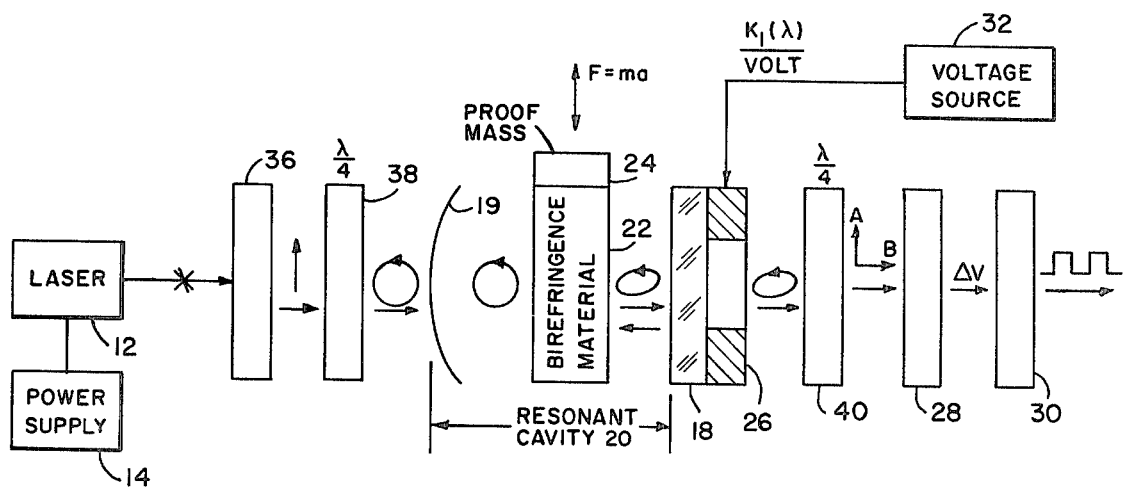
FIG. 2 is a diagrammatic view of an alternate arrangement of the passive laser accelerometer of the present invention.

In the embodiment shown in FIG. 2 wherein like numerals refer to like parts, circular polarized waves are used to reduce noise in the birefringent material. In this embodiment the beam is directed through a polarizer 36 and through a quarter wave plate 38. A partially transmitting mirror 19 and into cavity 20. The circular beam is passed through birefringent element 22 and becomes elliptical and is reflected back and forth between mirrors 16 and 19. A portion of the elliptical beam is passed through mirror 18 and a second quarter wave plate 40, polarizer 28 and detector 30. Operation of this embodiment is the same as described in conjunction with FIG. 1.

Figure 3:
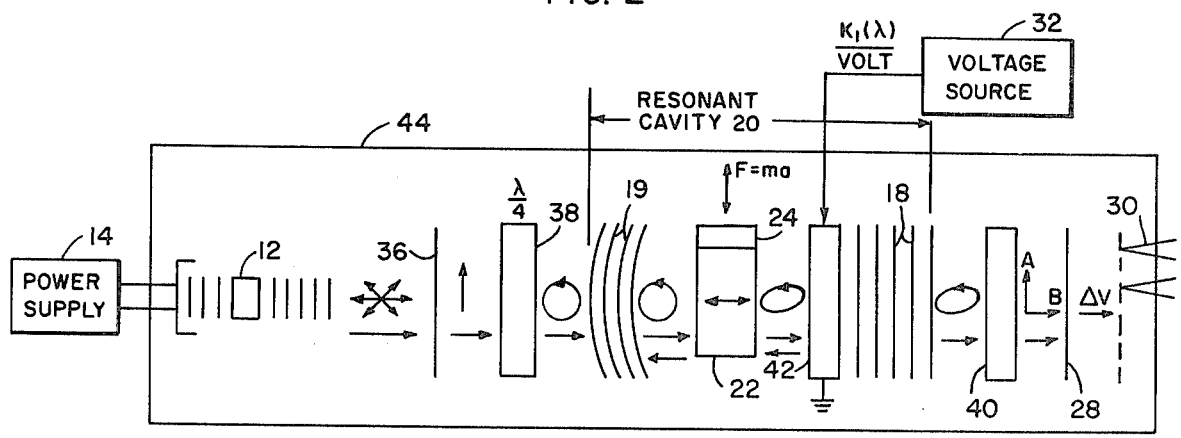
FIG. 3 is a diagrammatic view of the passive laser accelerometer of the present invention using integrated optics.

In the embodiment shown in FIG. 3 wherein like numerals refer to like parts, the accelerometer is made in an integrated optics format.

A laser 12 (solid state preferably) is energized by power source 14 which directs a beam through a polarizer 36, quarter wave plate 38, partially transmitting mirror 19, birefringent material 22, and then through an electro-optics phase modulator 42, disposed in the resonant cavity 20, mirror 18, a second quarter wave plate 40, polarizer 28 and detector 30. Operation of this embodiment is the same as in FIG. 2.

FIG. 3 shows the system implemented in an integrated optics format. Polarizer 36, mirrors 19 and 18 are made of a simple grating structure etched in base 44. The quarter wave plate (λ/4) 38 could be a passive element material with a width equal to (λ/4) or an active element, a polarizing modulator. The electro-optic phase modulator is an active element that changes the index of refraction in proportion to an applied voltage thus changing the effective length of the optical resonant cavity to ensure a resonant peak. The most straight forward electro-optic modulation of a guided-wave mode produces a phase retardation as the mode propagates through an electrically induced birefringent medium. The phase modulation can be obtained by propagating a mode with a propagation in the Y-Z direction and applying an electric field in the X direction. The piezoelectric element 18 in FIGS. 1 & 2 physically moves the mirror 18 as a function of the applied voltage.

The primary goal of integrated optics is to integrate a variety of discrete optical elements, both active and passive, into a monolithic, miniaturized planar structure. In other words, it is an optical analogy of integrated circuit technology in the electronics industries. By this analogy, it is reasonable to assume that optical systems in the integrated optics configuration can be made more efficient, comPact and stable at lower cost. In the embodiment shown in FIG. 3, which is a monolithic structure, galium-aluminum-arsenide is used as the substrate. Other substrates may be resorted to such as silicon or lithium-niobate, however, in this structure an interface must be used between the laser and the substrates and the detectors.

The polarizers used herein may be any of many types available, such as H-sheet polaroid, a molecular analog of the wire grid.

I claim:

1. A passive laser accelerometer comprising:
   (a) first and second reflective members disposed in spaced relation forming a resonant cavity;
   (b) a birefringent material having a proof mass thereon disposed in said resonant cavity;
   (c) means external of said resonant cavity for generating a beam of coherent light said beam disposed to be reflected back and forth between said reflective members and through said birefringent material, part of said beam disposed for passing through said second reflective member.
   (d) means for changing the effective length of said resonant cavity;
   (e) detector means for receiving said part of said beam and for providing an output which is a beat frequency proportional to accelerations acting on said accelerometer.

2. An accelerometer as in claim 1 wherein said means for changing the effective length of said resonant cavity includes a sensing element disposed for activation for changing the effective length of said resonant cavity and a voltage source for activation of said sensing element responsive to the output of said detector.

3. An accelerometer as in claim 2 wherein said sensing element is a piezoelectric crystal attached to said plane mirror.

4. An accelerometer as in claim 3 including a plane polarizer disposed between said piezoelectric crystal and said detector means.

5. An accelerometer as in claim 4 including a plane polarizer and a quarter wave plate disposed between said laser source and said first reflective member and a second quarter wave plate and a second plate polarizer disposed between said piezoelectric crystal and said detector.

6. An accelerometer as in claim 2 including an electro-optic modulator disposed between said second reflective member and said birefringent material.

7. An accelerometer as in claim 6 including a polarizer and a quarter wave plate disposed between said laser and said first reflective member and a second quarter wave plate and polarizer disposed between said detector and said second reflective member.

8. An accelerometer as in claim 7 including a base having a substrate thereon and said polarizers, said electro-optic phase modulator, and said detector is comprised of grating structure etched in said substrate.

* * * * *